United States Patent
Park et al.

(10) Patent No.: US 8,456,551 B2
(45) Date of Patent: Jun. 4, 2013

(54) PHOTOGRAPHING APPARATUS AND SMEAR CORRECTION METHOD THEREOF

(75) Inventors: Byeong-chan Park, Suwon-si (KR); Sang-ryoon Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 12/950,007

(22) Filed: Nov. 19, 2010

(65) Prior Publication Data

US 2011/0134290 A1 Jun. 9, 2011

(30) Foreign Application Priority Data

Dec. 3, 2009 (KR) .......... 10-2009-0119105

(51) Int. Cl.
*H04N 9/64* (2006.01)
*H04N 5/217* (2006.01)
*H04N 3/14* (2006.01)

(52) U.S. Cl.
USPC .......... 348/248; 348/241; 348/243; 348/249; 348/316

(58) Field of Classification Search
USPC .......... 348/248, 249, 316, 241, 243
See application file for complete search history.

(56) References Cited

U.S. PATENT DOCUMENTS

| 2001/0009444 A1* | 7/2001 | Sagara | 348/441 |
| 2007/0076976 A1* | 4/2007 | Uhrich et al. | 382/275 |

* cited by examiner

*Primary Examiner* — Roberto Velez
*Assistant Examiner* — Joel Fosselman
(74) *Attorney, Agent, or Firm* — Drinker Biddle & Reath LLP (57) ABSTRACT

A photographing apparatus including an imaging device configured to obtain a first image of a subject captured with a long shutter exposure time and a second image of the subject captured by setting a short shutter exposure time, wherein the long exposure time is greater than the short exposure time; and a live-view generation unit configured to generate a smear-corrected third image by subtracting pixel values of the second image from the corresponding pixel values of the first image. A smear correction method of a photographing apparatus, the method including capturing a first image of a subject by setting a long electrical shutter exposure time; capturing a second image of a subject by setting a short electrical shutter exposure time; and generating a smear-corrected third image by subtracting pixel values of the second images from the corresponding pixel values of the first image.

15 Claims, 6 Drawing Sheets

FIG. 1

(PRIOR ART)

PHOTOGRAPHING APPARATUS AND SMEAR CORRECTION METHOD THEREOF

CROSS-REFERENCE TO RELATED PATENT APPLICATION

This application claims the benefit of Korean Patent Application No. 10-2009-0119105, filed on Dec. 3, 2009, in the Korean Intellectual Property Office, the entire disclosure of which is incorporated herein by reference.

BACKGROUND

1. Field of the Invention

Embodiments of the invention relate to a photographing apparatus and a smear correction method thereof, and more particularly, to a photographing apparatus capable of correcting a smear, and a smear correction method thereof.

2. Description of the Related Art

Photographing apparatuses such as digital cameras or phone cameras have a live-view or preview function for previewing an image of a subject in real time. A live-view or preview function implemented in some digital cameras provides a preview image of a subject that is regularly refreshed. The user may use the preview image to determine whether or not to photograph the subject without using an optical view finder.

Figure 1:
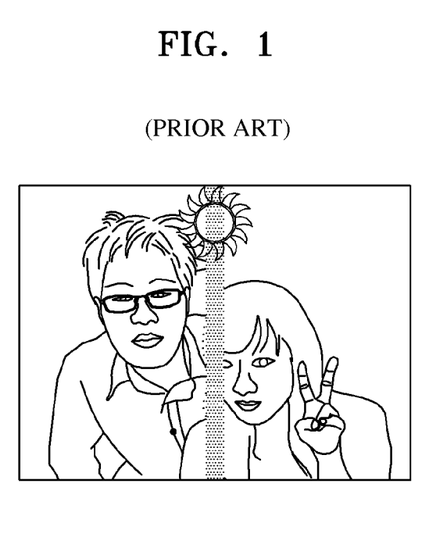
FIG. 1 illustrates a smeared image generated when a digital camera photographs a bright light source.

As illustrated in FIG. 1, when a photographing apparatus captures an image including a bright light source, a smear may occur in the form of a bright vertical or horizontal stripe. A smear refers to a bright stripe that occurs on an image captured by a photographing apparatus. The smear is often caused by a very bright subject such as the sun or a lamp captured with a high shutter speed and short exposure time. The smear in the captured image may be called glare. When a smear occurs, image quality is reduced.

SUMMARY

Embodiments of the invention provide a photographing apparatus capable of providing a high-quality live-view image and a moving image by correcting a smear in the image, and a smear correction method thereof.

A photographing apparatus is disclosed. The photographing apparatus including an imaging device configured to obtain a first image of a subject captured with a long shutter exposure time and a second image of the subject captured by setting a short shutter exposure time, wherein the long exposure time is greater than the short exposure time; and a live-view generation unit configured to generate a smear-corrected third image by subtracting pixel values of the second image from the corresponding pixel values of the first image.

The photographing apparatus may include an imaging device control unit configured to set the short shutter exposure time to have a value of approximately zero (0), or approximately a minimum value for a shutter exposure time.

The first image may be an image data and smear data.

The second image may be smear data.

The photographing apparatus may include a first buffer configured to temporarily store the first image; and a second buffer configured to temporarily store the second image.

The live-view generation unit is configured to generate the smear-corrected third image once for each of a plurality of predetermined cycles.

The predetermined cycle may be a cycle of two vertical synchronization periods, and the first image may be obtained in a first vertical synchronization period and the second image may be obtained in a second vertical synchronization period following the first vertical synchronization period.

The photographing apparatus may include a display unit configured to display the third image.

The imaging device may be a charge-coupled device (CCD).

A smear correction method of a photographing apparatus is disclosed. The method including capturing a first image of a subject by setting a long electrical shutter exposure time; capturing a second image of a subject by setting a short electrical shutter exposure time; and generating a smear-corrected third image by subtracting pixel values of the second images from the corresponding pixel values of the first image.

The short electrical shutter exposure time may be approximately zero (0), or approximately a minimum value for a shutter exposure time.

The first image may include image data and smear data.

The second image may include smear data.

Obtaining a first image captured may include obtaining a first image captured in a first vertical synchronization period; and wherein obtaining a second image captured, further comprises: obtaining a second image in a second vertical synchronization period following the first vertical synchronization period.

The method may include performing the steps of the method for each of a plurality of predetermined cycles in real time.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION OF THE INVENTION

Hereinafter, embodiments of the invention will be described in detail with reference to the attached drawings. Like reference numerals in the drawings denote like elements. In the following description of embodiments of the invention, a detailed description of known functions and configurations incorporated herein will be omitted when it may make the subject matter of embodiments of the invention unclear.

Figure 2:
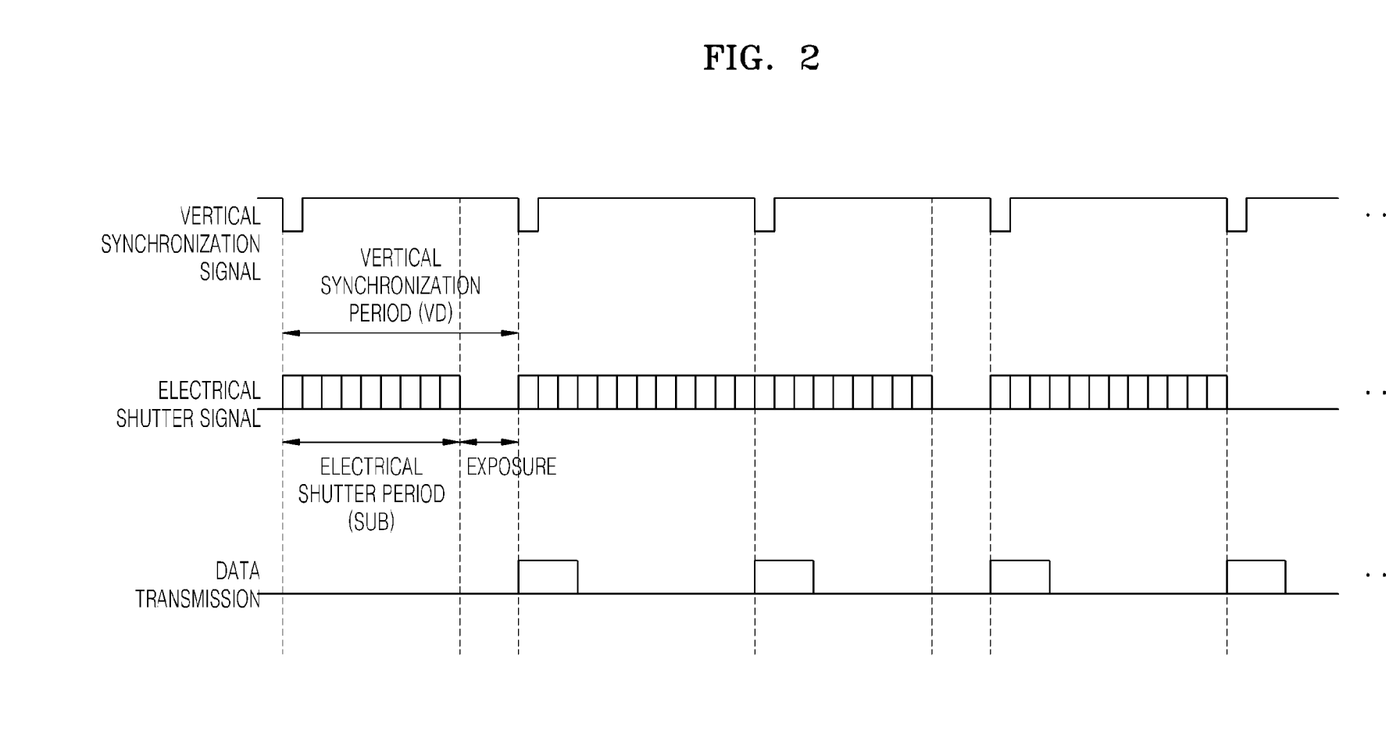
FIG. 2 is a diagram for describing a method of driving an imaging device, according to an embodiment of the invention.

FIG. 2 is a diagram for describing a method of driving an imaging device, according to an embodiment of the invention.

Referring to FIG. 2, the imaging device according to the current embodiment controls exposure and transmission by using a vertical synchronization signal and an electrical shutter signal. When the vertical synchronization signal is input, an electrical shutter signal synchronized to the vertical synchronization signal is input and, when the electrical shutter signal is input, an electrical shutter operates. In a period after the operation of the electrical shutter ends until a next vertical synchronization signal is input, electrical shutter exposure is performed. When electrical shutter exposure ends, an image signal converted from an incident light signal is transmitted. Hereinafter, a period between first and second vertical synchronization signals is referred to as a vertical synchronization period and, in each vertical synchronization period, a period in which the electrical shutter operates is referred to as an electrical shutter period. In each vertical synchronization period, exposure is performed after the electrical shutter period until the vertical synchronization period ends. When exposure ends, data is transmitted.

In the imaging device according to the current embodiment, exposure is performed in a cycle of two vertical synchronization periods. From among the two vertical synchronization periods, in a first vertical synchronization period, an image is captured by setting a sufficient exposure time and, in a second vertical synchronization period, an image is captured by setting no exposure time or a very short exposure time. FIG. 2 illustrates an exemplary case when the second vertical synchronization period does not have an exposure time. The exposure time of the first vertical synchronization period is sufficient to obtain image data, and may be set as a default value previously set in a photographing apparatus or may be set by a user. The exposure time of the second vertical synchronization period has a value of approximately zero (0), or approximately a minimum value for a shutter exposure time so as to obtain only smear data. The exposure time of the second vertical synchronization may be automatically set as a default minimum value for the photographing apparatus. If an exposure time does not exist or is short, image data of a subject is very small to be ignorable but smear data is very large. Thus, the image captured in the second vertical synchronization period may be regarded as a smear image including only smear data. In FIG. 2, the exposure time of the second vertical synchronization period is shorter than that of the first vertical synchronization period. However, on the contrary, the exposure time of the first vertical synchronization period may have a value 0 or a minimum value so as to obtain smear data, and the exposure time of the second vertical synchronization period may be sufficiently long so as to obtain image data including smear data.

Figure 3:
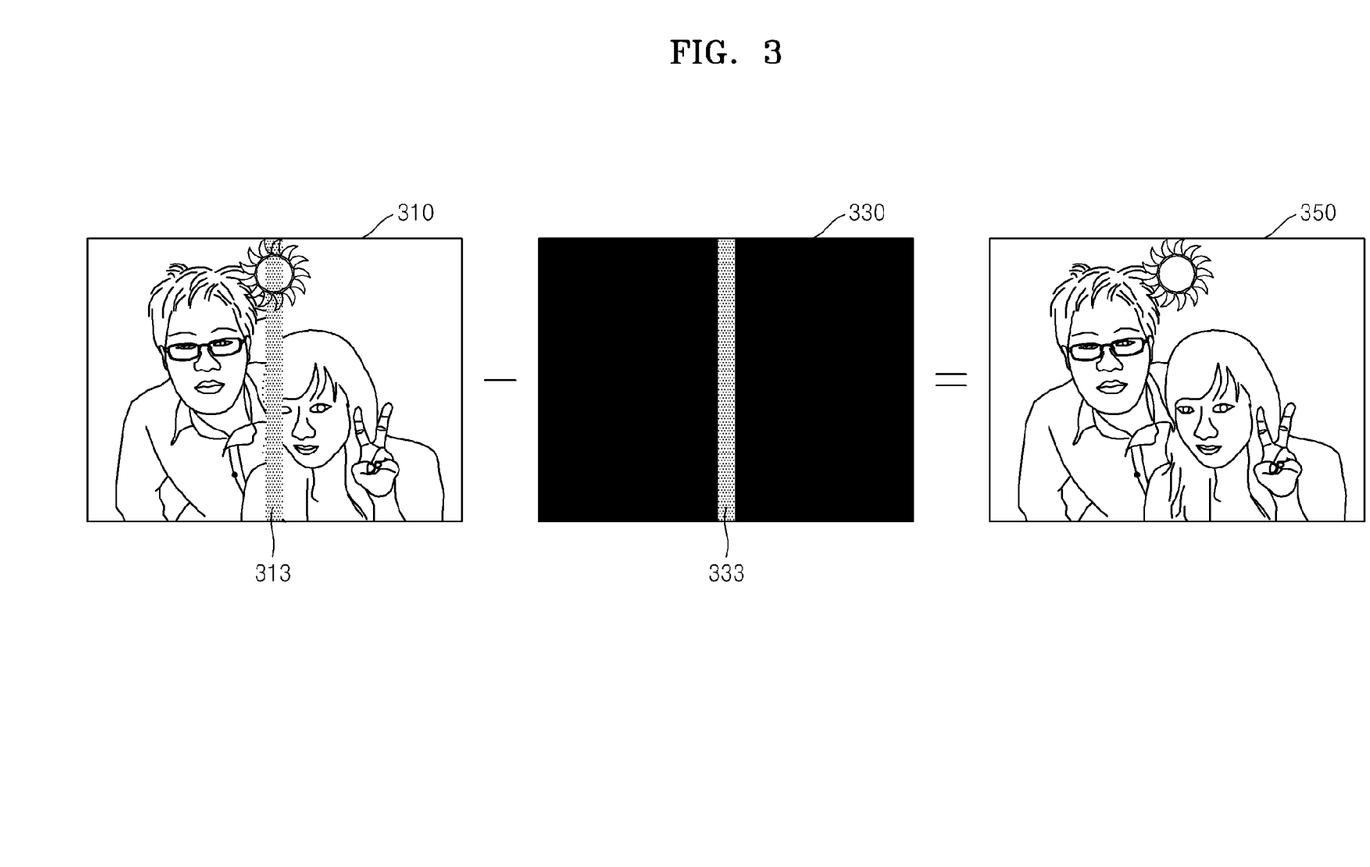
FIG. 3 is a diagram for describing a concept of generating a live-view image by using the imaging device driving method illustrated in FIG. 2, according to an embodiment of the invention.

FIG. 3 is a diagram for describing a concept of generating a live-view image by using the imaging device driving method illustrated in FIG. 2, according to an embodiment of the invention.

Referring to FIG. 3, an image 310 is an original image in which a smear 313 occurs near the sun in the form of a vertical and bright purple stripe. An image 330 is a smear image in which regions other than a smear 333 are black or only contain a small amount of image data. An image 350 is a smear-corrected live-view image. The image 310 is obtained by setting a sufficient exposure time in a first vertical synchronization period, and includes smear data and image data. The image 330 is obtained by setting a short exposure time in a second vertical synchronization period, and includes smear data. Accordingly, the image 350 without a smear may be obtained by subtracting pixel values of the image 330 from those of the image 310. The smear pixels in image 330 may be determined by setting a threshold value and not considering pixels below the threshold value to be part of the smear.

Figure 4:
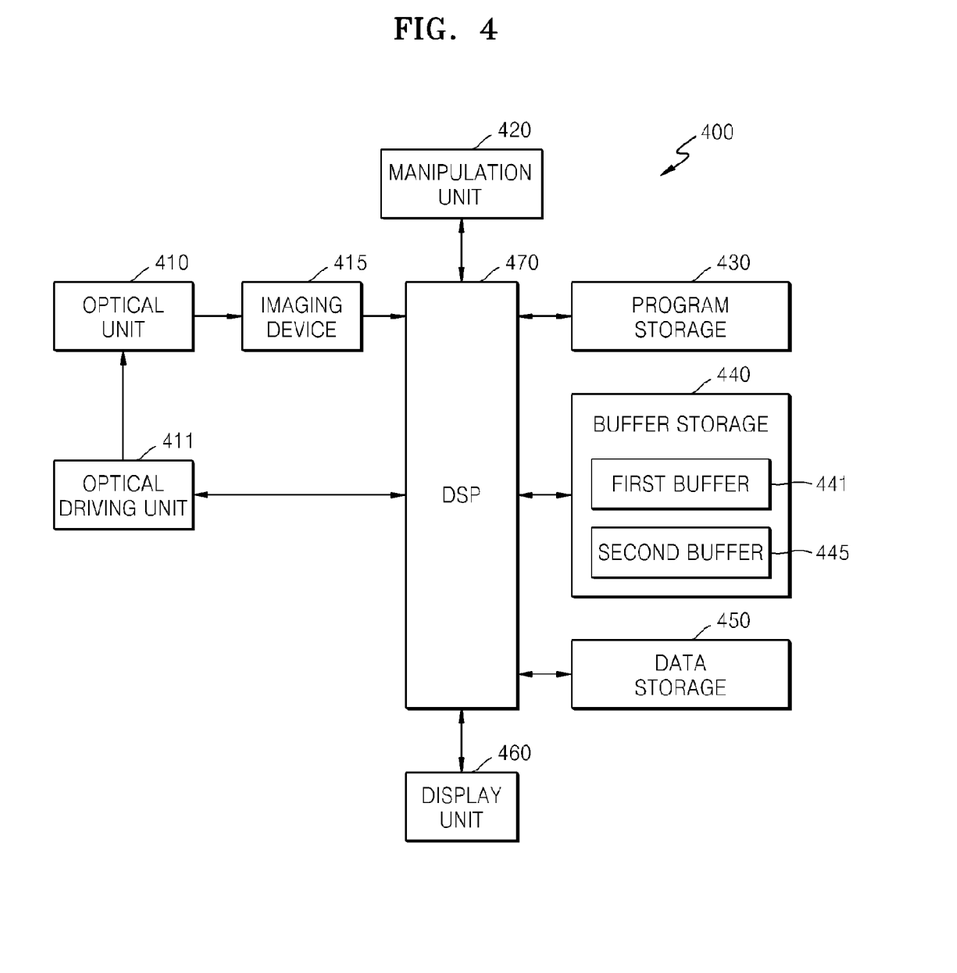
FIG. 4 is a block diagram of a photographing apparatus for smear correction, according to an embodiment of the invention.
Figure 5:
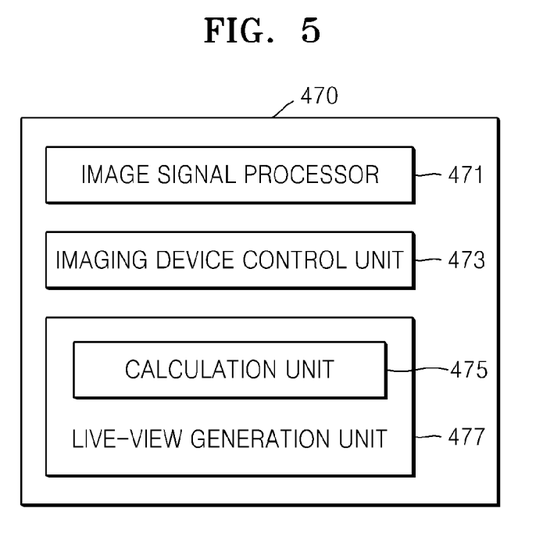
FIG. 5 is a block diagram of a digital signal processor (DSP) of the photographing apparatus illustrated in FIG. 4.

FIG. 4 is a block diagram of a digital camera as a photographing apparatus 400 for smear correction, according to an embodiment of the invention. FIG. 5 is a block diagram of a digital signal processor (DSP) 470 of the photographing apparatus 400 illustrated in FIG. 4. The photographing apparatus 400 is not limited to a digital camera and includes various digital image processing apparatuses for processing digital still and moving images, e.g., a mobile phone, a camcorder, a monitoring camera, a robot, a personal digital assistant (PDA) and a personal multimedia player (PMP).

Referring to FIG. 4, the digital photographing apparatus 400 may include an optical unit 410, an optical driving unit 411, an imaging device 415, a manipulation unit 420, a program storage 430, a buffer storage 440, a data storage 450, a display unit 460 and the DSP 470.

The optical unit 410 provides an optical signal input from a subject, to the imaging device 415. The optical unit 410 may include one or more lenses such as a zoom lens for narrowing or widening a viewing angle according to a focal length and a focus lens for focusing on a subject. Also, the optical unit 410 may further include an iris for adjusting the intensity of light.

The optical driving unit 411 controls the position of a lens, opening or closing of the iris, and the like. Focusing may be performed by moving a lens and the intensity of light may be adjusted by controlling opening or closing of the iris. The optical driving unit 411 may control the optical unit 410 according to a control signal automatically generated due to an image signal that is input in real time or a control signal that is manually input due to a user's manipulation.

An optical signal transmitted through the optical unit 410 reaches a light-receiving surface of the imaging device 415 so as to form an image of the subject. The imaging device 415 is a charge-coupled device (CCD) for converting the optical signal into an electrical signal. The imaging device 415 captures an image by setting a long electrical shutter exposure time and an image by setting a short electrical shutter exposure time from the subject in every predetermined cycle.

The manipulation unit 420 may receive a control signal from outside the photographing apparatus 400, e.g., from a user. The manipulation unit 420 includes various function buttons such as a shutter-release button for inputting a shutter-release signal to take a picture by exposing the imaging device 415 to light for a certain time, a power button for providing power to the digital photographing apparatus 400, wide-angle and telephoto zoom buttons for widening or narrowing a viewing angle, text input buttons, a mode selection button for selecting a mode such as a photographing mode or a reproducing mode, and buttons for setting white balance and exposure. The manipulation unit 420 may be implemented in the form of buttons as described above but is not limited thereto and may also be implemented in any form through which the user may input signals, for example, a keyboard, a touch pad or a remote controller.

Also, the digital photographing apparatus 400 includes the program storage 430 for storing programs such as operating and application systems used to drive the digital photographing apparatus 400, the buffer storage 440 for temporarily storing data necessary for and generated by operating the digital photographing apparatus 400, and the data storage 450 for storing image files including image signals and various types of data necessary for the programs. In order to separately store the images captured by the imaging device 415 by setting different exposure times, the buffer storage 440 may be divided into different storage spaces or may include two or more independent buffers. In FIG. 4, the buffer storage 440 includes two buffers such as first and second buffers 441 and 445.

Furthermore, the digital photographing apparatus 400 includes the display unit 460 for displaying an operation state of the digital photographing apparatus 400 and image data captured by the digital photographing apparatus 400. The display unit 460 may provide visual data and/or auditory data to the user, and may be implemented as a liquid crystal display (LCD) panel, an organic light-emitting diode (OLED) panel, an electrophoretic display (EPD) panel or the like. The display unit 460 may have a form of a touch screen for receiving inputs according to the user's touch so as to operate as a user input interface together with the manipulation unit 420. The display unit 460 provides a live-view or moving image before photographing the subject, to the user in real time. Since an image of the subject has to be processed and displayed on the display unit 460 in real time while the digital photographing apparatus 400 performs a live-view function, the imaging device 415 repeatedly performs an imaging operation for capturing an image of the subject to generate image data in every predetermined cycle. For example, the display unit 460 generates image data in a cycle of one vertical synchronization period and updates and displays a smear-corrected live-view image in a cycle of two vertical synchronization periods. The digital photographing apparatus 400 further includes the DSP 470 for processing an input image signal and controlling other elements according to the input image signal or an external input signal.

The DSP 470 is electrically connected to the imaging device 415, the optical driving unit 411, the display unit 460 and the like so as to exchange control signals with other elements to control operations of the elements, or processes data. The DSP 470 may be implemented as a microchip, a circuit board including a microchip, or the like, and components of the DSP 470 may be implemented as software or circuits of the DSP 470.

The DSP 470 performs image signal processing and may control other elements according to the result of image signal processing. Also, the DSP 470 may control other elements according to a control signal input from the user through the manipulation unit 420. In addition, the DSP 470 controls the display unit 460 to display a live-view image. Operations of the DSP 470 will now be described in detail with reference to FIG. 5.

Referring to FIG. 5, the DSP 470 includes an image signal processor 471, an imaging device control unit 473 and a live-view generation unit 477 including a calculation unit 475.

The image signal processor 471 converts an electrical signal input from the imaging device 415 into an image signal on which image processing is performable. The image signal processor 471 performs image signal processing such as gamma correction, color filter array interpolation, color matrix, color correction, and color enhancement on the image signal so as to convert the image signal according to human vision. Also, the image signal processor 471 may perform an auto white balance algorithm or an auto exposure algorithm if functions corresponding to the algorithms are set. Furthermore, the image signal processor 471 adjusts the size of image data by using a scaler and generates an image file in a certain format by compressing the image data. On the contrary, the image signal processor 471 may decompress the image file. Here, an image compression format may be a reversible format or an irreversible format. For example, image compression may also be performed in a Joint Photographic Experts Group (JPEG) format or a JPEG 2000 format. The image signal processor 471 may perform the above-described image signal processing on an image signal that is input in real time in a live-view mode before photographing a subject, or an image signal that is input due to a shutter-release signal. In this case, different types of image signal processing may be performed on the image signals. The image signal processor 471 temporarily stores images captured by setting different electrical shutter exposure times before a live-view image is generated, in the buffer storage 440. An image captured by setting a long electrical shutter exposure time may be stored in the first buffer 441 and an image captured by setting a short electrical shutter exposure time may be stored in the second buffer 445, or vice versa.

The imaging device control unit 473 may control the imaging device 415 according to a control signal automatically generated due to an image signal that is input in real time or a control signal that is manually input due to a user's manipulation. Also, the imaging device control unit 473 controls the electrical shutter exposure time of the imaging device 415. In a cycle of two vertical synchronization periods, the imaging device control unit 473 may set a long exposure time in a first vertical synchronization period and a short exposure time in a second vertical synchronization period. Also, on the contrary, the imaging device control unit 473 may set a short exposure time in the first vertical synchronization period and a long exposure time in the second vertical synchronization period. With respect to a very bright subject, if an electrical shutter exposure time has a value 0 or is close to a value 0, a time for collecting image data is insufficient and thus only smear data is obtained with almost no image data. Accordingly, the short exposure time for obtaining the smear data may be set as a value of approximately 0 (no exposure) or a minimum value of the digital photographing apparatus 400. The term long exposure time means that both the smear data and the image data may be captured during the long exposure. The term short exposure time means that substantially just the smear data may be captured during the short exposure time. Some image data may be captured during the short exposure time, in which case the calculation unit 475 may separate the smear part of the image from the image data (of the subject) part of the image. The calculation unit 475 may set a threshold value for pixels of the captured image and determine that pixels that are below a certain value are not part of the smear part. The image signal processor 471 performs image processing on an image signal obtained by performing an imaging operation in the imaging device 415 according to an exposure time control signal of the imaging device control unit 473, and the processed image signal is input to the buffer storage 440.

The live-view generation unit 477 provides a smear-corrected image obtained by the calculation unit 475 in every predetermined cycle, to the display unit 460. The calculation unit 475 subtracts RGB pixel values of an image including only smear data, which is captured by setting a short exposure time, (a smear image) from RGB pixel values of an original image including both smear data and image data, which is captured by setting a long exposure time, (a smeared image). Since the smeared image includes both smear data and image data while the smear image includes only smear data, the smear-corrected image may be obtained by subtracting corresponding RGB pixel values of the smeared image and the smear image. Alternatively, the calculation unit 475 may detect the location of a smear from the smeared image or the smear image as xy coordinate values, and may subtract the RGB pixel values of the smeared image and the smear image only at the detected location of the smear. Since the calculation unit 475 performs calculation on a smeared image obtained in a vertical synchronization period and a smear image obtained in a next vertical synchronization period, the live-view generation unit 477 provides the smear-corrected image to the display unit 460 in a cycle of two vertical synchronization periods.

Although the calculation unit 475 and the live-view generation unit 477 are separated from the image signal processor 471 in FIG. 5, in another case, the image signal processor 471 integrally calculates and subtracts pixel values of an original image and a smear image which are obtained in a cycle of two vertical synchronization periods so as to obtain a smear-corrected live-view image. Accordingly, embodiments of the invention may be implemented without adding a complex function to the DSP 470.

Figure 6:
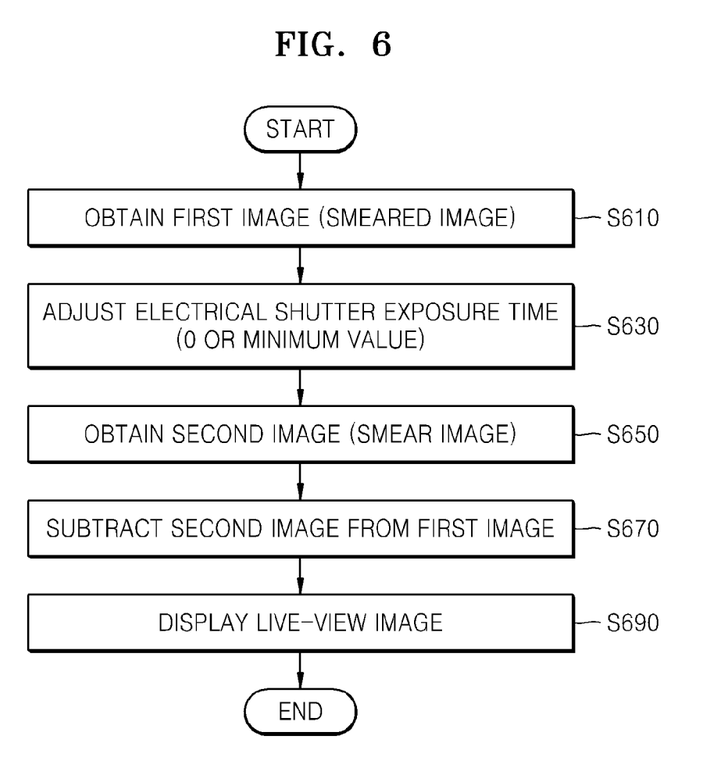
FIG. 6 is a flowchart of a smear correction method of a photographing apparatus, according to an embodiment of the invention.

FIG. 6 is a flowchart of a smear correction method of a photographing apparatus, according to an embodiment of the invention.

The smear correction method according to the current embodiment includes obtaining a smeared image captured by setting a long electrical shutter exposure time and a smear image captured by setting a short electrical shutter exposure time with respect to a subject in every predetermined cycle, and generating a smear-corrected live-view image by subtracting corresponding pixel values of the smeared image and the smear image.

Referring to FIG. 6, an imaging device obtains a smeared image in a first vertical synchronization period having a long electrical shutter exposure time, and temporarily stores the smeared image in a buffer (operation S610). The smeared image includes image data and smear data of a subject. The long electrical shutter exposure time may be set by a user or may be automatically set as a predetermined default value.

An imaging device control unit adjusts an electrical shutter exposure time to have a value 0 or a minimum value of the photographing apparatus, which is close to a value 0 (operation S630).

The imaging device obtains a smear image in a second vertical synchronization period following the first vertical synchronization period and having a short electrical shutter exposure time less than the long electrical shutter exposure time, and temporarily stores the smear image in the buffer (operation S650). The short electrical shutter exposure time is the electrical shutter exposure time having a value of approximately 0 or approximately a minimum value for a shutter exposure time, which is adjusted by the imaging device control unit in operation S630.

A live-view generation unit obtains a smear-corrected image by subtracting corresponding pixel values of the smeared image and the smear image (operation S670).

A display unit updates and provides the smear-corrected image to the user in a cycle of two vertical synchronization periods (operation S690). Accordingly, if the photographing apparatus is in a 60 frames per sec. (FPS) mode, a 30 FPS effect may be achieved. If a frame rate of the imaging device is set as a 60 FPS mode or above, a more natural image may be obtained in comparison to a case when a 30 FPS mode is set. In general, a large number of FPS mode is set to perform high-speed auto focusing (AF) or to obtain an accurate image. In a 120 FPS mode, an image of 60 FPS may be obtained according to the current embodiment.

Figure 7:
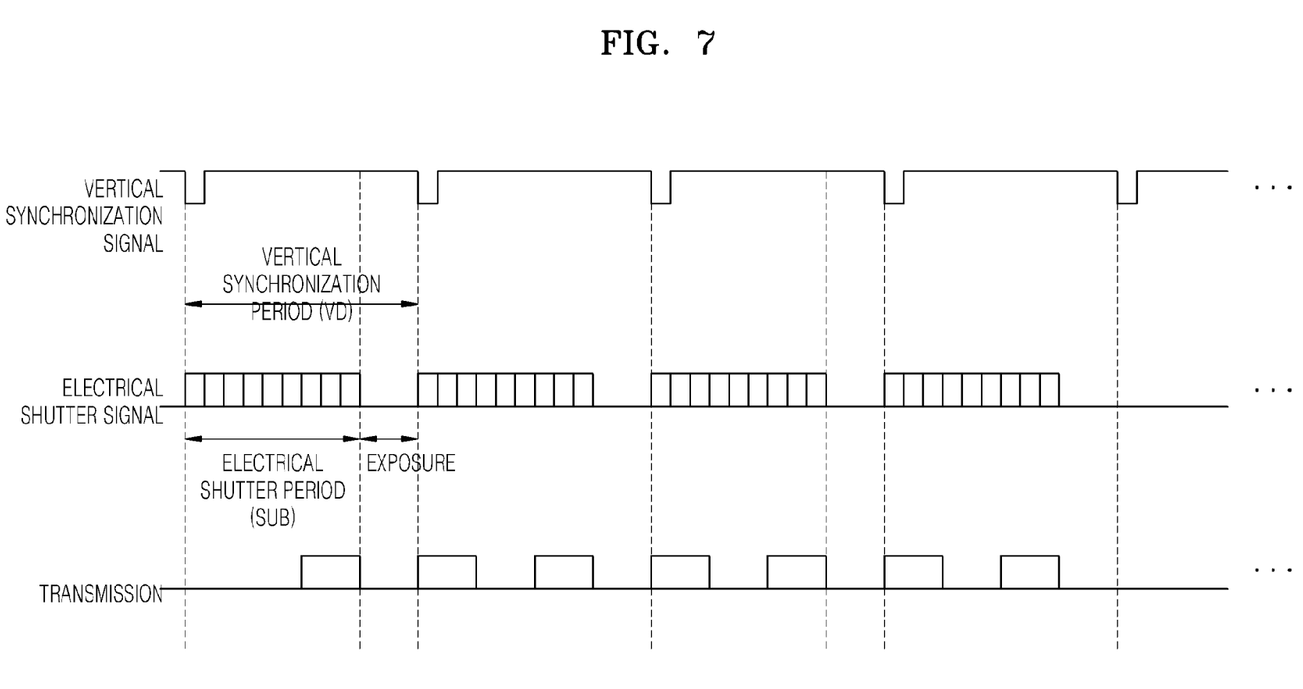
FIG. 7 is a diagram for describing a method of driving an imaging device, according to another embodiment of the invention.

Although data is transmitted in every vertical synchronization period and a smear-corrected image is provided in a cycle of two vertical synchronization periods according to the above embodiments of the invention, as illustrated in FIG. 7, according to another embodiment of the invention, if data is transmitted twice in a vertical synchronization period, a smear image and a smeared image may be processed in a vertical synchronization period so as to obtain a smear-corrected image. In this case, a photographing apparatus may achieve a 30 FPS effect in a 30 FPS mode and a 60 FPS effect in a 60 FPS mode.

As described above, according to embodiments of the invention, a high-quality image may be obtained by obtaining smear data by using an electrical shutter exposure time of an imaging device and correcting the smear data in an original smeared image.

Also, embodiments of the invention have the advantage that they may be applied to products using a CCD as an imaging device or other suitable imaging device, without adding a complex function for smear correction to an existing DSP. Accordingly, satisfaction of consumers may be increased and cost reduction may be achieved.

The device described herein may comprise a processor, a memory for storing program data and executing it, a permanent storage such as a disk drive, a communication port for handling communications with external devices, and user interface devices, etc. Any processes may be implemented as software modules or algorithms, and may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of embodiments of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented by methods that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of embodiments of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A photographing apparatus comprising:
    an imaging device configured to obtain a first image of a subject captured with a long shutter exposure time and a second image of the subject captured by setting a short shutter exposure time, wherein the long exposure time is greater than the short exposure time; and
    a live-view generation unit configured to generate a smear-corrected third image by subtracting pixel values of the second image from the corresponding pixel values of the first image once for each of a plurality of predetermined cycles, wherein the predetermined cycle is a cycle of two vertical synchronization periods.

2. The photographing apparatus of claim 1, an imaging device control unit configured to set the short shutter exposure time to have a value of approximately zero (0), or approximately a minimum value for a shutter exposure time.

3. The photographing apparatus of claim 1, wherein the live-view generation unit is configured to generate a smear-corrected third image by subtracting pixel values of the second image from the corresponding pixel values of the first image, wherein pixel values of the second image are subtracted from the corresponding first image if the pixel value of the second image is above a predetermined threshold value.

4. The photographing apparatus of claim 1, wherein the first image comprises image data and smear data.

5. The photographing apparatus of claim 1, wherein the second image comprises smear data.

6. The photographing apparatus of claim 1, further comprising:
    a first buffer configured to temporarily store the first image; and
    a second buffer configured to temporarily store the second image.

7. The photographing apparatus of claim 1,
    wherein the first image is obtained in a first vertical synchronization period and the second image is obtained in a second vertical synchronization period following the first vertical synchronization period.

8. The photographing apparatus of claim 1, further comprising a display unit configured to display the third image.

9. The photographing apparatus of claim 1, wherein the imaging device is a charge-coupled device (CCD).

10. A smear correction method of a photographing apparatus, the method comprising:
    capturing a first image of a subject by setting a long electrical shutter exposure time;
    capturing a second image of a subject by setting a short electrical shutter exposure time; and
    generating a smear-corrected third image by subtracting pixel values of the second image from the corresponding pixel values of the first image once for each of a plurality of predetermined cycles, wherein the predetermined cycle is a cycle of two vertical synchronization periods.

11. The method of claim 10, wherein the short electrical shutter exposure time is approximately zero (0), or approximately a minimum value for a shutter exposure time.

12. The method of claim 10, wherein the first image comprises image data and smear data.

13. The method of claim 10, wherein the second image comprises smear data.

14. The method of claim 10, wherein obtaining a first image captured, further comprises:
    obtaining a first image captured in a first vertical synchronization period; and
    wherein obtaining a second image captured, further comprises:
    obtaining a second image in a second vertical synchronization period following the first vertical synchronization period.

15. The method of claim 10, further comprising:
    performing the steps of the method for each of a plurality of predetermined cycles in real time.

* * * * *